(12) United States Patent
Behm (10) Patent No.: US 6,497,175 B2
(45) Date of Patent: Dec. 24, 2002

(54) COFFEE ROASTER ATTACHMENTS FOR HOME ROTISSERIE OVEN APPLIANCE

(76) Inventor: Joseph Behm, 6457 Dwane Ave., San Diego, CA (US) 92120

( * ) Notice: Subject to any disclaimer, the term of this patent is extended or adjusted under 35 U.S.C. 154(b) by 0 days.

(21) Appl. No.: 09/848,703

(22) Filed: May 3, 2001

(65) Prior Publication Data

US 2001/0037584 A1 Nov. 8, 2001

Related U.S. Application Data

(60) Provisional application No. 60/201,827, filed on May 3, 2000.

(51) Int. Cl.[7] ............................................. A47J 37/04
(52) U.S. Cl. ..................... 99/427; 99/419; 99/421 H
(58) Field of Search ............................ 99/427, 421 H, 99/419, 426, 339, 340; 34/63

(56) References Cited

U.S. PATENT DOCUMENTS

| | | | | |
|---|---|---|---|---|
| 2,705,450 A | * | 4/1955 | Steinbook | 99/427 |
| 5,632,098 A | | 5/1997 | Finch | |
| 5,771,600 A | | 6/1998 | Romanow | |
| 6,076,453 A | * | 6/2000 | Hsu | 99/339 |
| 6,142,064 A | * | 11/2000 | Backus et al. | 99/421 H |
| 6,220,152 B1 | * | 4/2001 | Baldwin et al. | 99/427 |
| 6,279,462 B1 | * | 8/2001 | Kim | 99/327 |

* cited by examiner

Primary Examiner—Reginald L. Alexander
(74) Attorney, Agent, or Firm—D. Whitlow Bivens (57) ABSTRACT

The present invention is a coffee bean roster attachment for conventional home rotisserie overs. The invention features a roasting tube made of mesh or thin-walled perforated metal and a variety of different components to adapt the roasting tube to the rotisserie apparatus supplies with the conventional home rotisserie oven.

19 Claims, 12 Drawing Sheets

COFFEE ROASTER ATTACHMENTS FOR HOME ROTISSERIE OVEN APPLIANCE

CLAIM OF PRIORITY

This application claims the benefit of U.S. Provisional Application No. 60/201,827 filed May 3, 2000 entitled Coffee roaster attachments for home rotisserie oven appliance.

FIELD OF THE INVENTION

This invention relates to attachments for home appliances and, in the preferred embodiments, to home rotisserie oven attachments for roasting coffee.

SUMMARY OF THE INVENTION

The present invention, in its preferred embodiments, provides a coffee roaster attachment for a home rotisserie oven. In one preferred embodiment, the roaster is a cylindrical stainless steel mesh container enclosed at one end by a gear wheel. Green coffee beans are poured into this cylinder and the open end is closed by a second gear wheel. The roaster is then advantageously placed into a conventional home rotisserie oven appliance with one of the gear wheels meshed with a motor-driven gear within the oven proper. The oven is then turned on causing rotation of the coffee beans in the container proximate to the oven's electrical heating element.

One of the many features of the preferred embodiments of the invention is that the coffee roaster advantageously incorporates the gear driven assembly normally supplied with a home rotisserie oven, thereby both substantially lowering the cost of the unit to the ultimate consumer and simplifying assembly and disassembly of the coffee roaster.

The gourmet coffee industry has been one of the fastest growing segments of the food processing business in the last few years. The present invention brings to consumers the ability to roast coffee in their homes in an efficient and economical way. The preferred embodiments of this invention enable gourmet coffee drinkers to cut their costs by as much as 50% and have even fresher coffee. For those who buy canned coffee, they now can, for mere pennies more than they are currently paying, enjoy gourmet coffee.

DETAILED DESCRIPTION OF THE PREFERRED EMBODIMENTS

The following description is of the best presently contemplated modes of carrying out the invention. This description is made for the purpose of illustrating the general principles of the invention and should not be taken in a limiting sense.

The Home Appliance Oven

Figure 1:
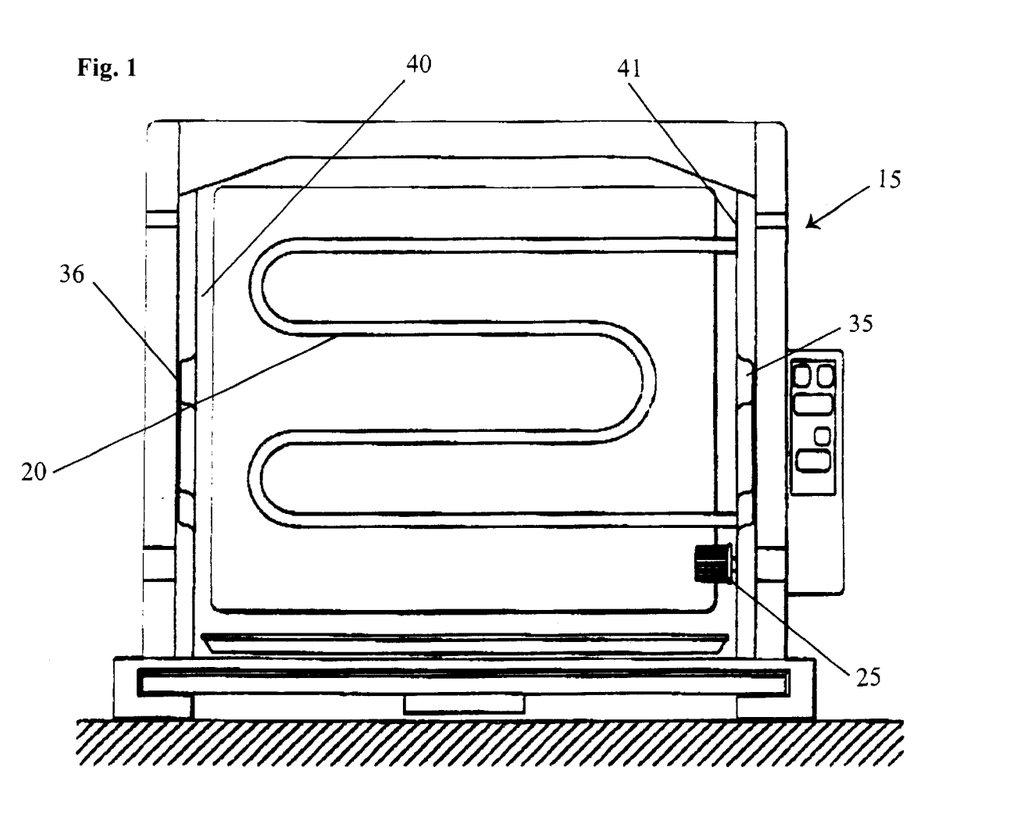
FIG. 1 is a front view of a home rotisserie oven.
Figure 2:
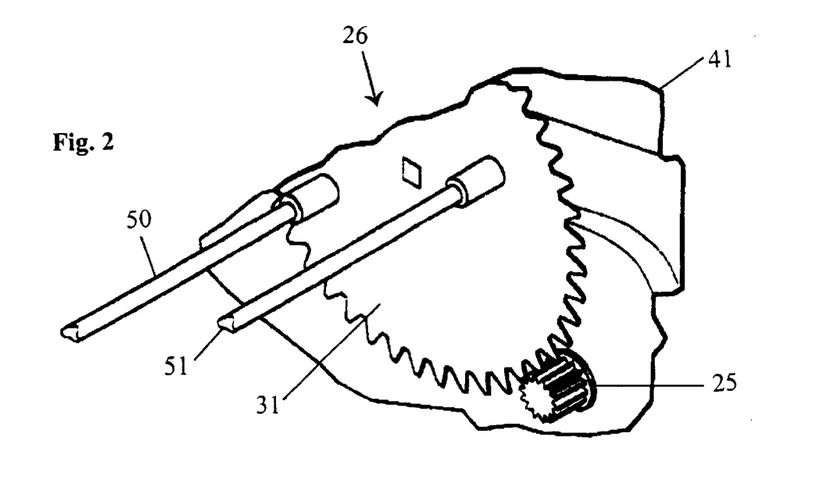
FIG. 2 is an enlarged view of a portion of a home rotisserie oven and a portion of a gear-driven rotisserie assembly illustrating the connection between the driving mechanism and the rotisserie assembly.

Referring now to FIGS. 1 and 2, a conventional home appliance oven 15 is shown having an electrical heating unit 20 and a gear wheel 25 within the oven. Gear 25 is driven by an electrical motor (not shown).

Figure 3:
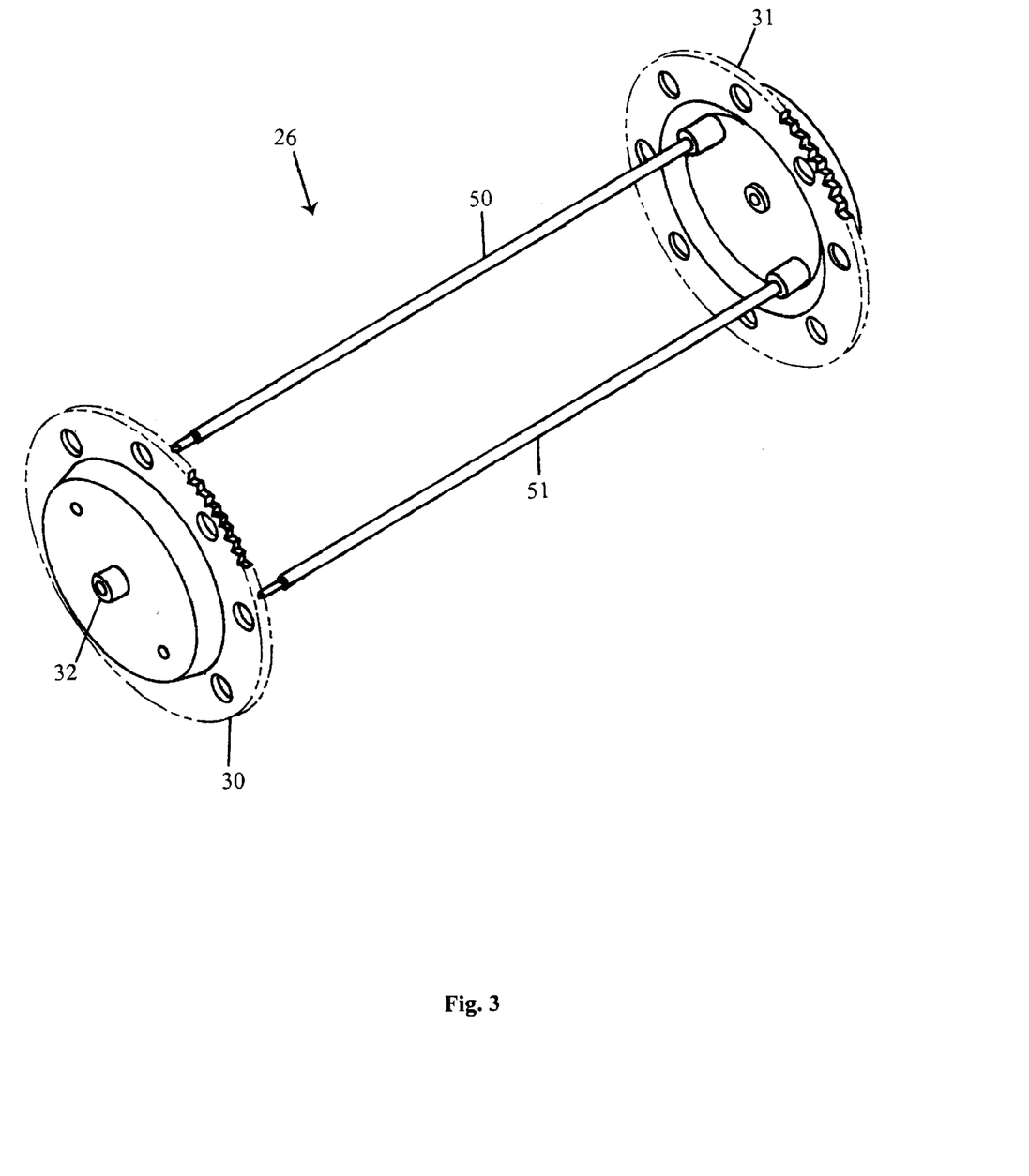
FIG. 3 is a perspective view of a gear-driven rotisserie assembly
Figure 5:
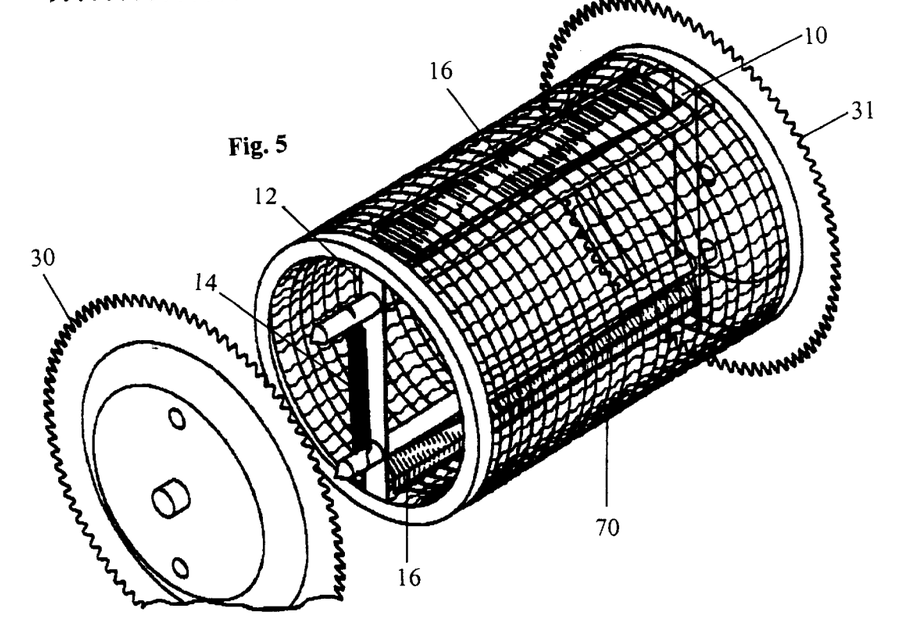
FIG. 5 is a perspective partially exploded view of a coffee roaster attachment and a gear-driven rotisserie assembly.

Gear 25 is adapted to continuously rotate a gear driven rotisserie assembly 26 shown in FIGS. 2 and 3. Rotisserie assembly 26 includes a pair of spaced gear wheels 30 and 31 adapted to rotate on stub axles 32 in open bearing surfaces 35 and 36 formed on juxtaposed inside oven walls 40 and 41, as shown in FIGS. 1 and 2. Gear wheels 30 and 31 are joined by a pair of rods 50 and 51. The opposite end of rods 50 and 51 are reduced in diameter (a reduced end of each is shown in FIGS. 3 and 5). Each of the gear wheels 30 and 31 include a pair of female receptacles, integrally attached to the wheels, that receive these reduced diameter rod ends. Set screws (not shown) in the female receptacles of gear wheel 31 removably attach the ends of rods 50 and 51 to this gear wheel. Rods 50 and 51 are conventionally used to hold meat that is being cooked in the rotisserie oven.

By way of specific example, one type of suitable rotisserie oven is the "Showtime TM Rotisserie BBQ" rotisserie oven offered for sale by Ronco. Additional information about this oven is available at the Ronco web site (www.ronco.com).

One Embodiment of the Coffee Roaster Attachment

Referring to FIG. 5, the components of the coffee roaster include cross bars 10 and 12, retainer spring 14, stir blades 16, and cylindrical tube 70, which provides the container wherein the green coffee beans are roasted. Tube 70 is advantageously made of either wire mesh, thin-walled metal, or a combination of both.

The manner of assembling and using the coffee roaster attachment is as follows: Rods 50 and 51 are threaded through appropriately spaced and sized holes in cross bars 10 and 12 allowing one end of cylindrical tube 70 to seat against gear 31. One end of spring 14 is then threaded onto the end of one of the rods 50 or 51. The spring is then stretched so that the other end of spring 14 may be threaded onto the other rod 50 or 51 and seated against cross bar 12. The spring 14 remains under tension in the assembled roaster attachment. That tension prevents spring 14 from slipping with respect to rods 50 and 51 thus holding cylindrical tube 70 in place against gear 31 until the spring is removed and the coffee roaster attachment is disassembled.

At this stage of assembly, the green coffee beans are loaded into the interior of cylindrical tube 70. Gear 30 is then seated against the end of cylindrical tube 70 by inserting the reduced-diameter ends of rods 50 and 51 into the female receptacles of gear 30 thus completely enclosing the green coffee beans within cylindrical tube 70.

Figure 4:
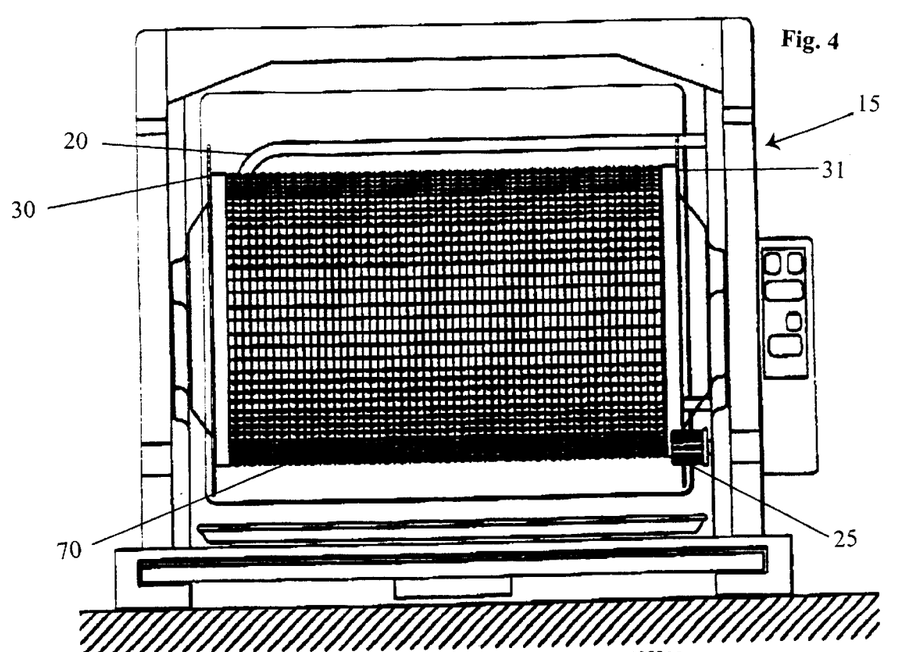
FIG. 4 is front view of one embodiment of a coffee roaster attachment installed in the home rotisserie oven shown in FIG. 1.

Once the green beans have been placed in the roaster tube and closed off by gear wheel 30, the completed unit is installed into the home appliance oven described above with one of the gear wheels 30 or 31 engaging gear 25. The installed roaster in the oven is shown in FIG. 4. At this stage, the user sets the timer on the oven unit for the desired roasting time, which will vary depending on the amount of green beans being roasted. The user then starts the oven unit, which will cause the heating elements 20 to begin to heat up and the rotation of the rotisserie gear drive assembly with the roaster appliance attached, thereby starting the roasting process.

To remove the roasted coffee beans, one merely removes the gear-driven rotisserie assembly 26 with its attached coffee roaster, takes off gear wheel 30 by sliding it off of the ends of rods 50 and 51 and pours out the roasted coffee beans out. As described above, spring 14 prevents the tube 70 from separating from the base gear drive 31 and thus prevent the beans from spilling all over.

A Second Embodiment of the Coffee Roaster Attachment

Figure 6:
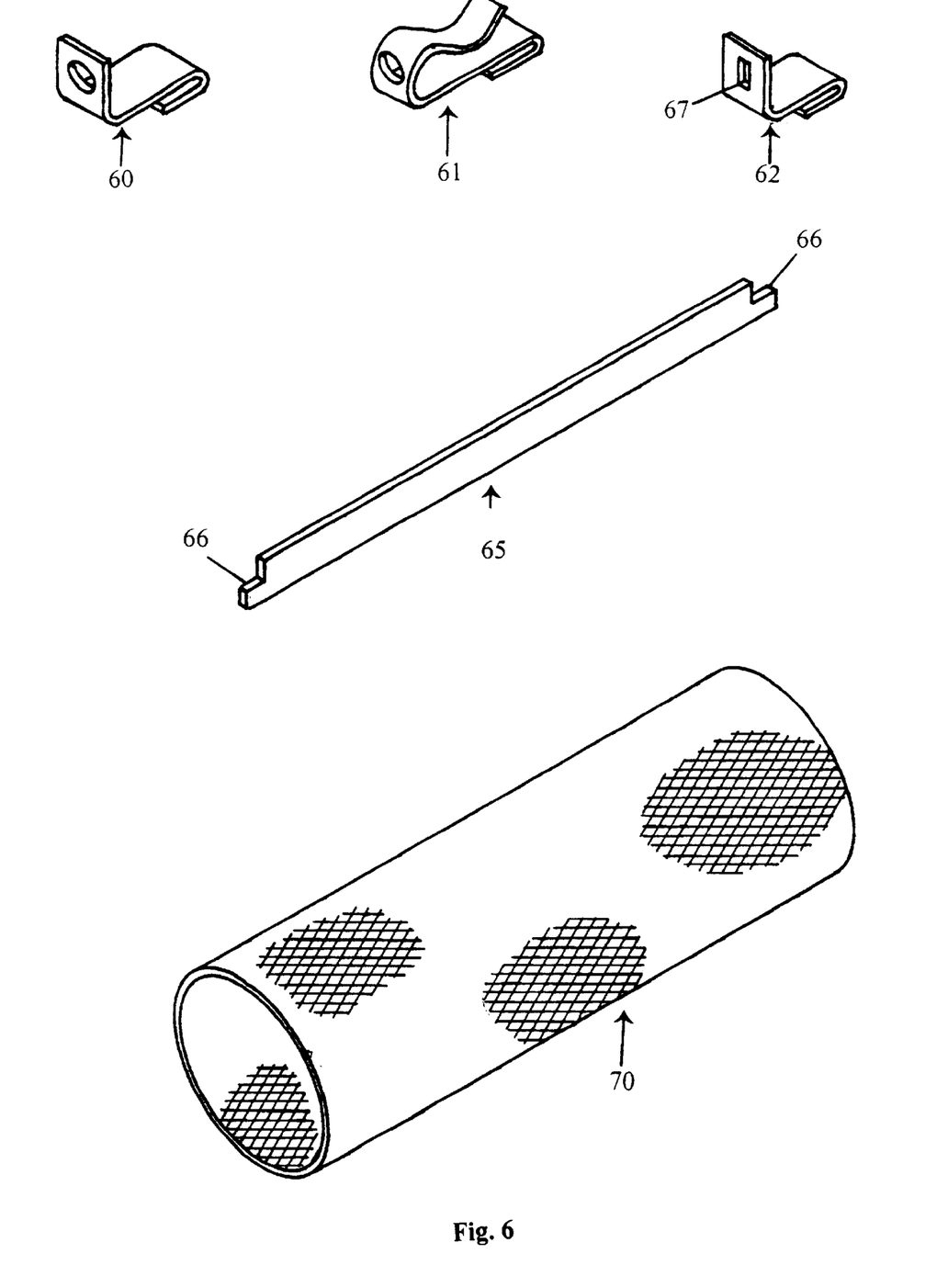
FIG. 6 is a perspective view of the components of an embodiment of the coffee roaster attachment.
Figure 11:
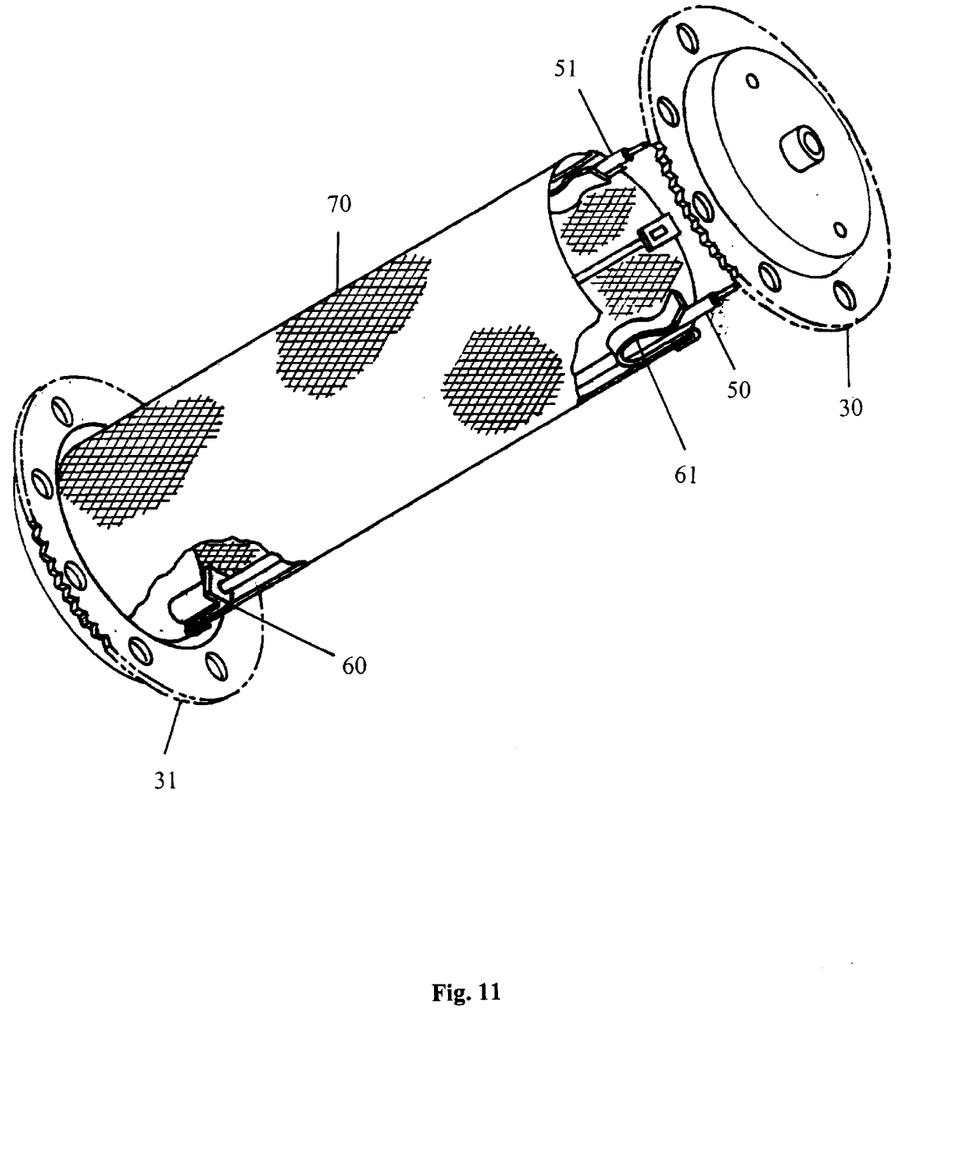
FIG. 11 is an exploded perspective view showing the assembly of the coffee roaster attachment.
Figure 12A:
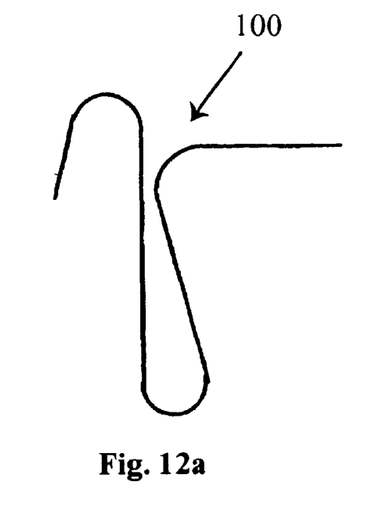
FIG. 12a is a side view of an alternative embodiment of the retainer clips for constructing the coffee roaster attachment of this invention.
Figure 12B:
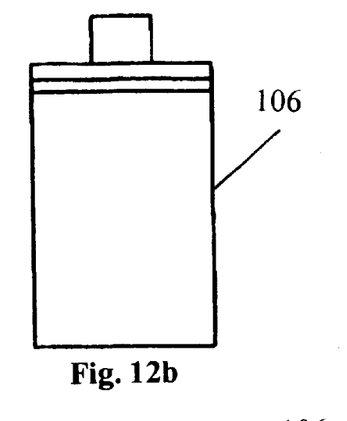
FIG. 12b is a front view of an alternative embodiment of the retainer clips for constructing the coffee roaster attachment of this invention.
Figure 12C:
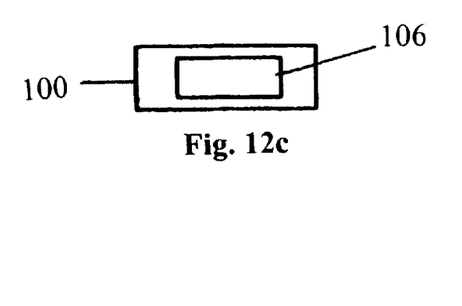
FIG. 12c is a bottom view of an alternative embodiment of the retainer clips for constructing the coffee roaster attachment of this invention.
Figure 13:
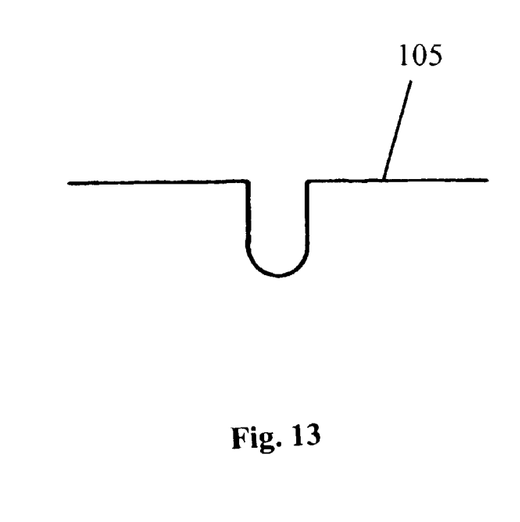
FIG. 13 illustrates a component of an alternative embodiment of the retainer clips for constructing the coffee roaster attachment of this invention.

An alternative embodiment of the coffee roaster attachment is depicted in FIGS. 6 and 11. The components of this embodiment include retainer clips 60, 61 and 62, stir blades 65, and cylindrical tube 70, which provides the container wherein the green coffee beans are roasted. Tube 70 is advantageously made of either wire mesh, thin-walled metal, or a combination of both.

Figure 7:
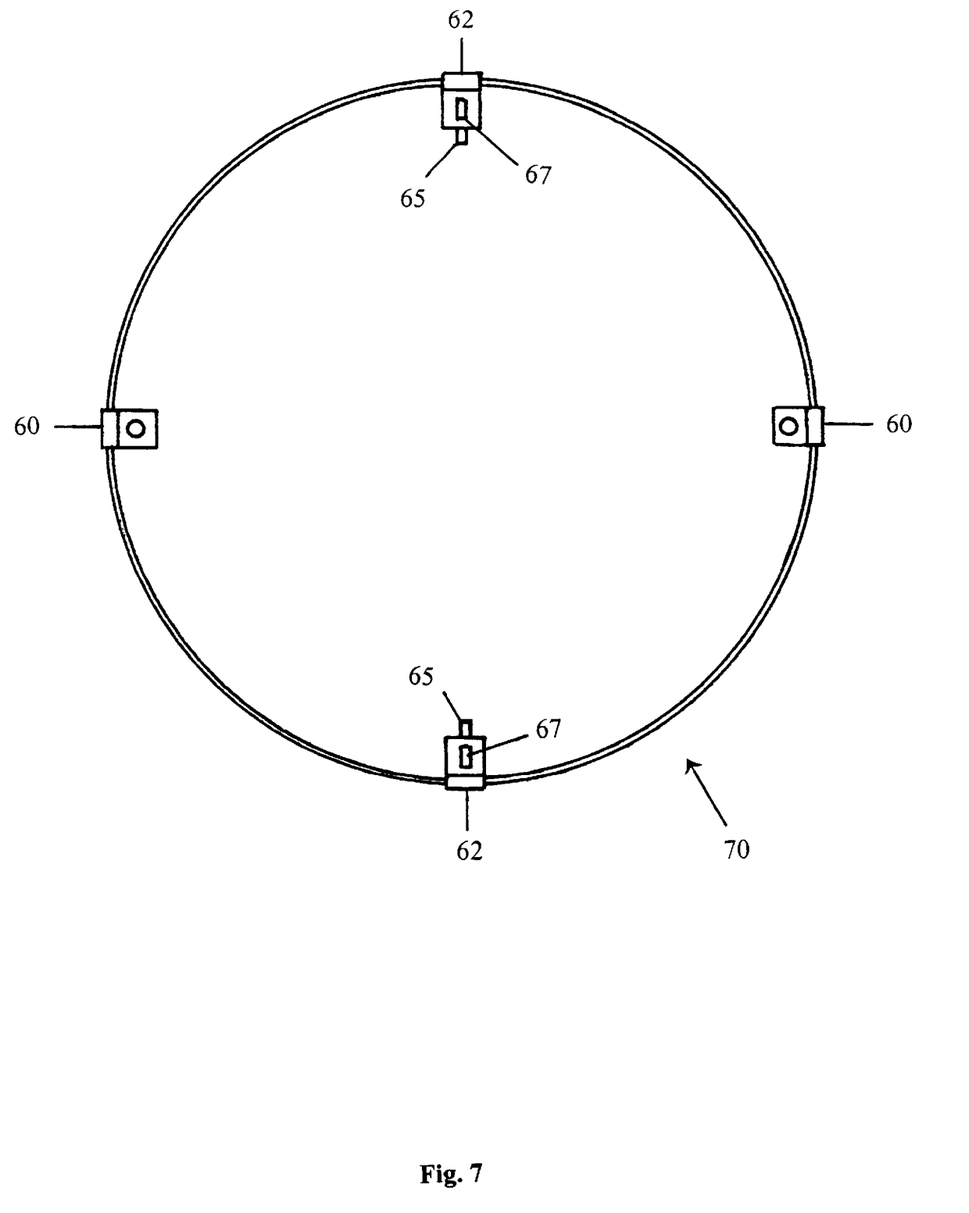
FIG. 7 is an elevational view of one end of the coffee roaster tube.

The manner of constructing the coffee roaster attachment is as follows: starting with FIG. 7, the clips are positioned on one end of the tube 70. Clips 60 are placed in two positions approximately 180° apart on the end of the tube and act not only as guides, but as stabilizers, to prevent the tube 70 from improper rotation. Clips 62 are attached approximately 90° apart from clips 60, as holders to secure the stir blades 65 to the base of the tube 70. Note that the stir blades 65 have extending tips 66 at opposite ends which fit into the rectangular opening 67 in each clip 62.

Figure 8:
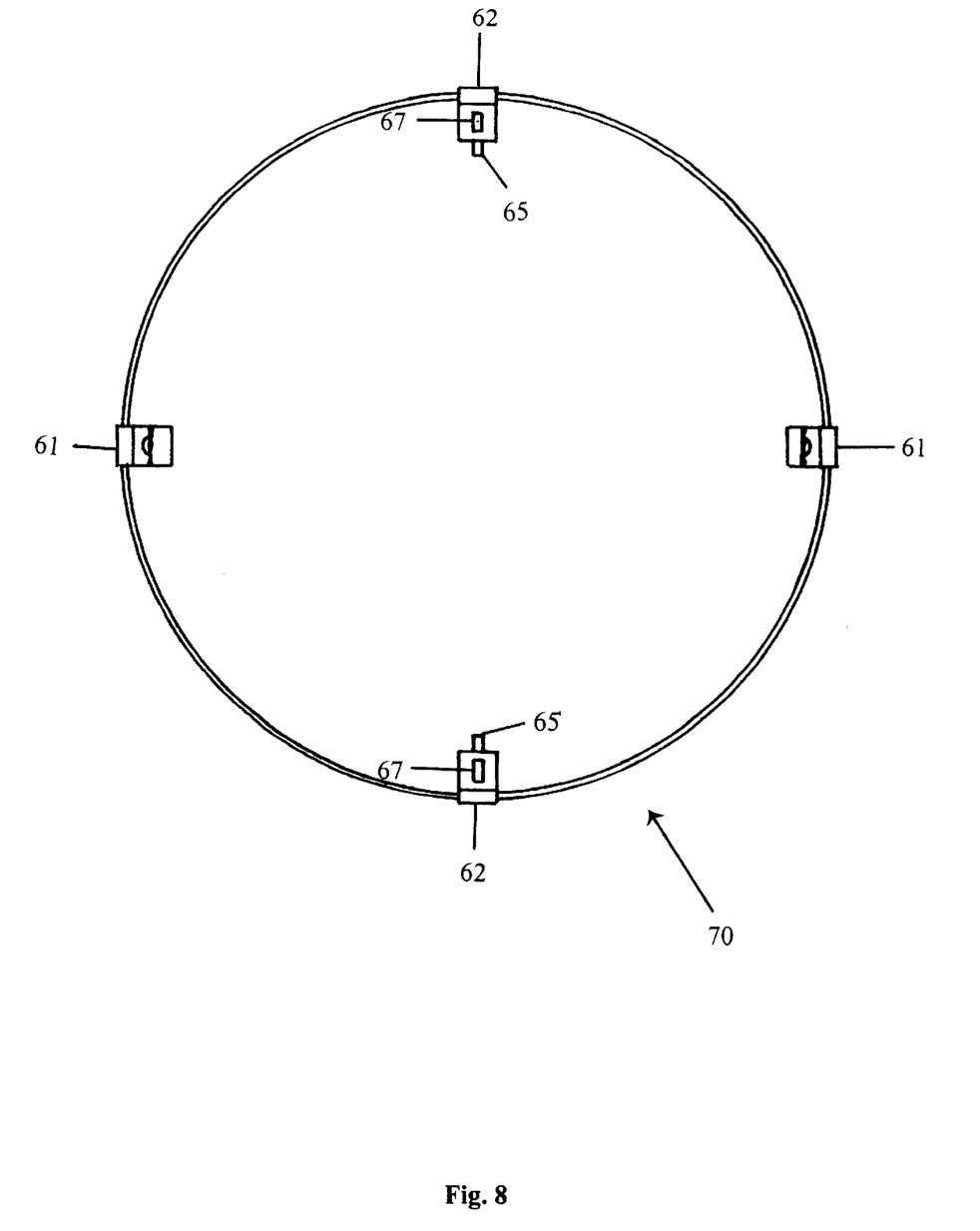
FIG. 8 is an elevational view of the opposite end of the coffee roaster tube.

Next refer to FIG. 8, which shows the opposite end of tube 70 and placement of the clips 61, 62 on this end of the tube 70. Before installing clips 62, the extended tips 66 of each stir blade 65 are inserted into slotted cut-outs 67 of clips 62 to secure the stir blade 65 in place.

Figure 9A:
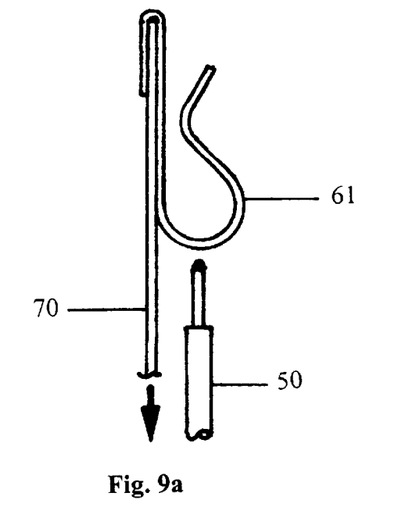
FIG. 9a is a close-up, cut-away view of one of the retainer clips just prior to engagement with the rod member of the gear driven rotisserie assembly.
Figure 9B:
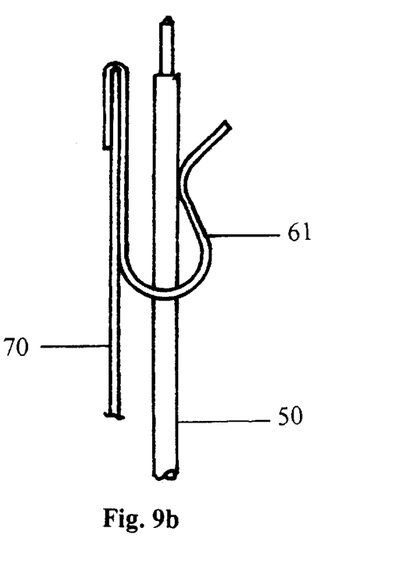
FIG. 9b is a close-up, cut-away view of the clip after engagement by the rod member.
Figure 10A:
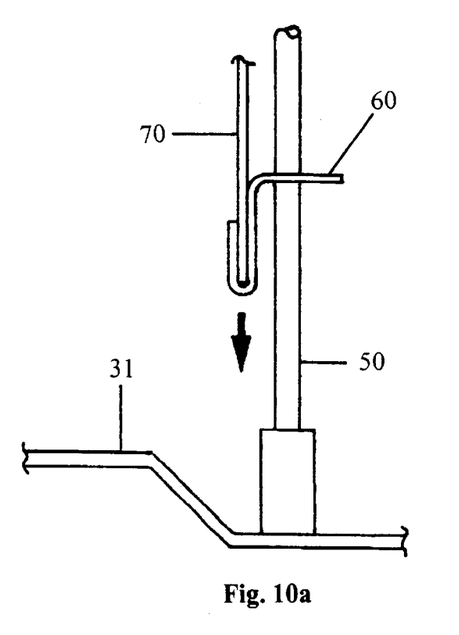
FIGS. 10a and 10b illustrate the manner in which another of the retainer clips engages the rod member as the coffee roaster tube is moved into position.
Figure 10B:
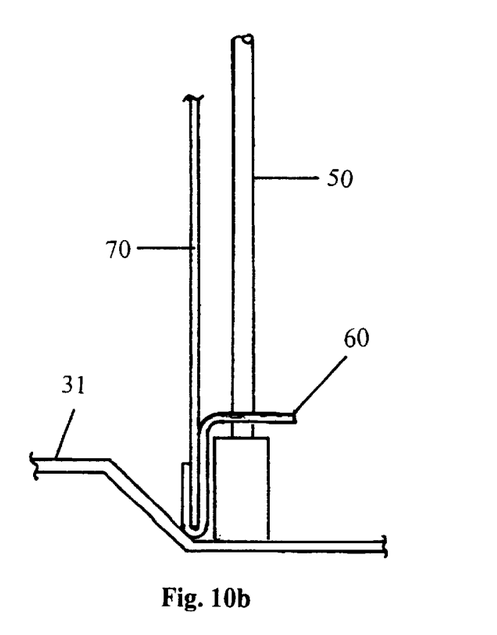

The next step of construction of the coffee roaster is to add the final set of clips 61 into place. These clips allow for tension/pinch action against the respective rods 50 and 51 shown in FIGS. 9a, 9b and 11. Clips 61 not only act as a stabilizer for the roaster tube 70 but also positively secure the tube 70 to one of the gear wheels. A close-up of the actual installation of the coffee roaster unit, once all of the clips have been put into place, can be viewed in FIG. 11. FIGS. 10a and 10b show how clips 60 slide down the body of rods 50 and 51 arriving at the end to form a closure of the tube 70 on the base of gear wheel 31. FIGS. 9a and 9b illustrates that once the tube 70 has been lowered onto the base of gear wheel 31, rods 50 and 51 slide through a hole in the base of clips 61. Once rods 50 and 51 start up through the openings in clips 61, they will press against the flanged portion of clip 61 pushing it slightly out in a toggle fashion, wherein enough tension is created that the flanged portion of clips 61 press up against the rods causing the roaster tube 70 to be held in position (until the tension is purposely relieved for dismantling the tube from gear wheel 31). The tension created by this toggle like action is sufficient to hold tube 70 to the gear drive wheel 31 in place with no slippage even when one pours the roasted beans out of the cylindrical tube. Thus, rods 50 and 51 force out the tension/pinch part of clip 61 to form a tension to secure the tube 70 to the gear driven rotisserie assembly 26.

A feature of this embodiment of the invention is that once the clips are installed on the unit, the installation of the unit takes mere seconds; additionally, by the very design of the clips, to dismantle and remove the coffee roaster attachment one need only, by using the thumb and forefinger, relieve tension by pressing simultaneously outward on the ears of clips 61, and the tube 70 will slide right off.

FIG. 11 further illustrates the final assembly of the coffee roaster attachment.

To fill the body of the tube with green coffee beans, prior to putting the top gear wheel 30 on (see FIG. 11), there is a large opening in the top of the nearly assembled unit. By merely pouring the green coffee beans into the body of the unit, one need only then place gear wheel 30 onto the unit, wherein gear wheel 30 acts as the final closure, preventing the green coffee beans from falling out.

A Third Embodiment of the Coffee Roaster Attachment

Figure 14:
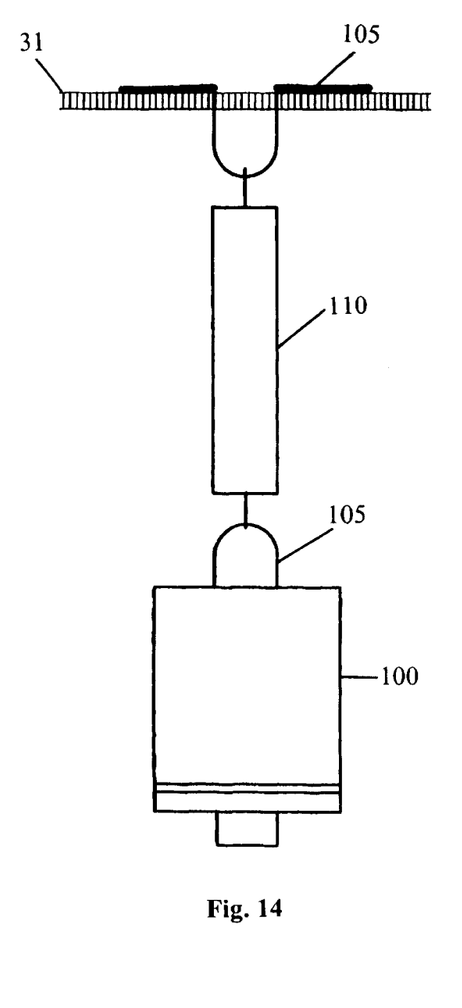
FIG. 14 illustrates an alternative embodiment of the retainer clips for constructing the coffee roaster attachment of this invention.
Figure 15:
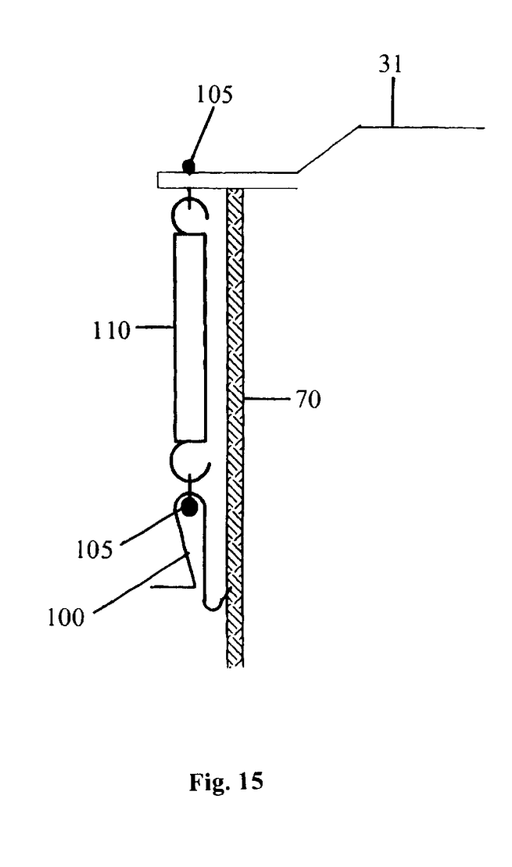
FIGS. 15 is an enlarged view of the alternative embodiment of the retainer clips for constructing the coffee roaster attachment of this invention illustrating how the retainer clip attaches the roaster shell to the gear wheel of the gear-driven rotisserie assembly.

Another option for securing a tube of a larger diameter than the tube described in the second embodiment of the invention, can be done with another set of clips/fasteners clips 100 and 105 (see FIGS. 12a–15). Again, one takes advantage of the existing hardware such as is provided by Ronco, specifically the gear drive wheels 30 and 31 which both have eight holes in them. First, wire clip 105 is slid through the opening 106 in clip 100, so that the hooped portion of clip 105 protrudes out the bottom of clip 100, as shown in FIG. 14. At this point, the tube 70 is placed on top of gear drive 31. Now one takes another clip 105 and, from the bottom of gear 31, inserts the hooped portion of clip 105 through one of the holes in the gear drive wheel 31 so that the hooped portion of clip 105 sticks out above the flat portion of the gear drive wheel 31 as shown in FIG. 15. One then takes a spring 110 of suitable tension, attaches one end of spring 110 to the hooped portion of clip 105 that is protruding through the hole 106 in clip 100 as shown in FIGS. 14 and 15. One then attaches the other end of the spring 110 to the hoop of clip 105 extending though the hole in gear wheel 31 as shown in FIGS. 14 and 15. By pulling on this completed assembly, one creates tension. The hooked portion of upper clip 100 is then inserted through the grid of the wire mesh that is the main component of tube 70 as shown in FIG. 15. This process is then repeated, strategically locating typically two or three more spring-loaded connectors in intervals sufficient to provide for stability. In this manner, tube 70 is attached to gear wheel 31.

After this is done, one simply pours the green coffee beans onto the tube 70, using the other gear drive wheel 30 to close everything off. One may also repeat the entire clip installation process to secure gear drive wheel 30 to the tube 70.

To remove the roasted beans, one merely needs to release the hooked portion of top clip 100 from the side wall of the tube 70, then remove the gear drive wheel 30 and pour the roasted beans out, all the time leaving in place the clips/fasteners holding the tube 70 to the other gear drive wheel 31. One reasonably skilled in the art will note that this embodiment of the invention may be used with a gear-driven rotisserie assembly having only one rod connecting the gear wheels.

A Fourth Embodiment of the Coffee Roaster Attachment

The final embodiment of the invention that will be discussed is adapted for use with rotisseries that do not have the large gear and dual rod rotisserie assembly 26 but instead have a single rotisserie rod adapted to fit into an existing receiver within an oven or over a gas, electric or charcoal grill. One example of such a rotisserie with the invention installed is shown in FIG. 16.

Figure 16:
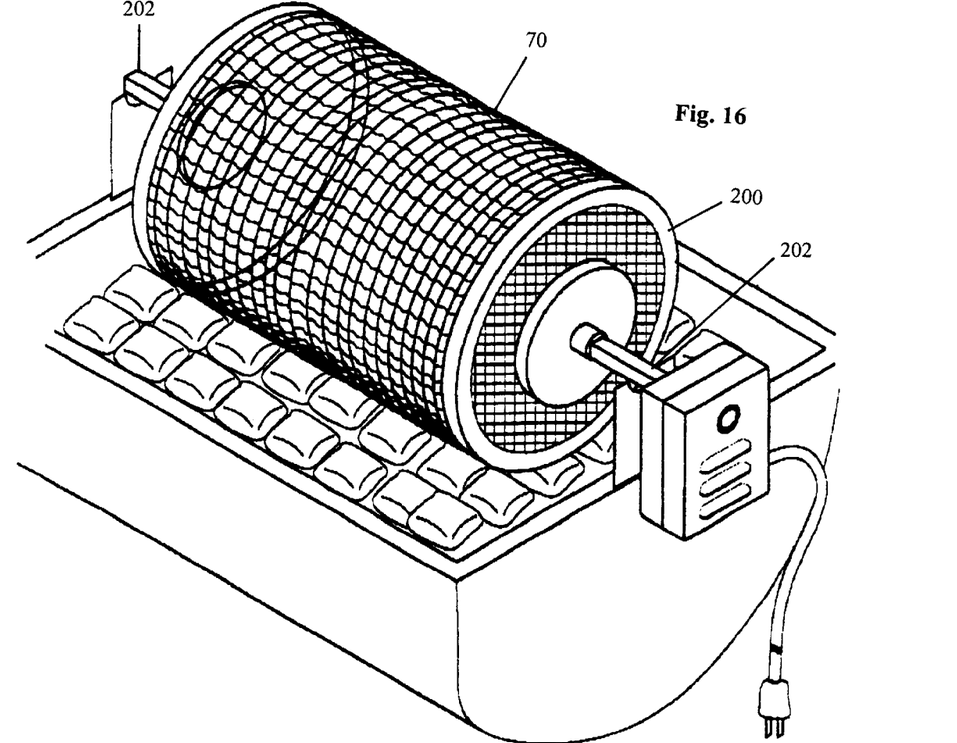
FIG. 16 is a perspective view of an alternate embodiment of the coffee roaster attachment installed in an alternate rotisserie apparatus.
Figure 17:
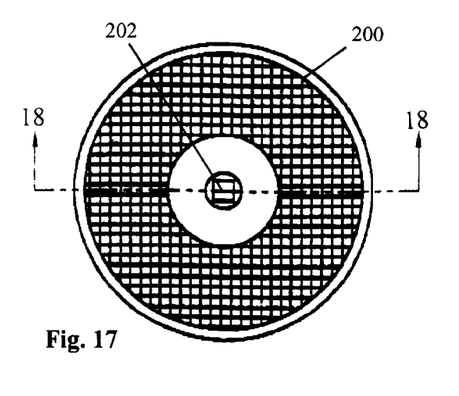
FIG. 17 illustrates a front elevational view of the embodiment shown in FIG. 16.
Figure 18:
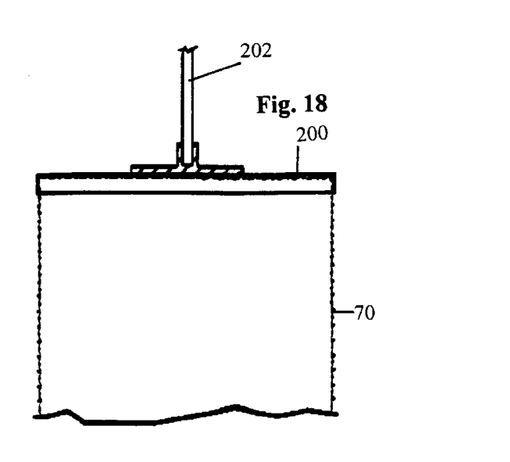
FIG. 18 is a cross sectional view of the alternate embodiment of the coffee roaster attachment taken along line 18—18 of FIG. 17.

As shown in FIGS. 16, 17, and 18, this embodiment of the invention consists of a wire mesh tube 70 with end caps 200. Integral with each end cap 200 is a stub axle 202. The length of tube 70 and stub axles 202 may be preselected to adapt to the dimensions of existing rotisseries. In addition, the cross sectional shape of stub axle 202 may be preselected to conform to the requirements of existing rotisseries. End caps 200 may be secured to tube 70 through a pressure fit, wire and spring tension clips such as those illustrated above or by any other means known in the art.

A Heat Shield Attachment

Figure 19:
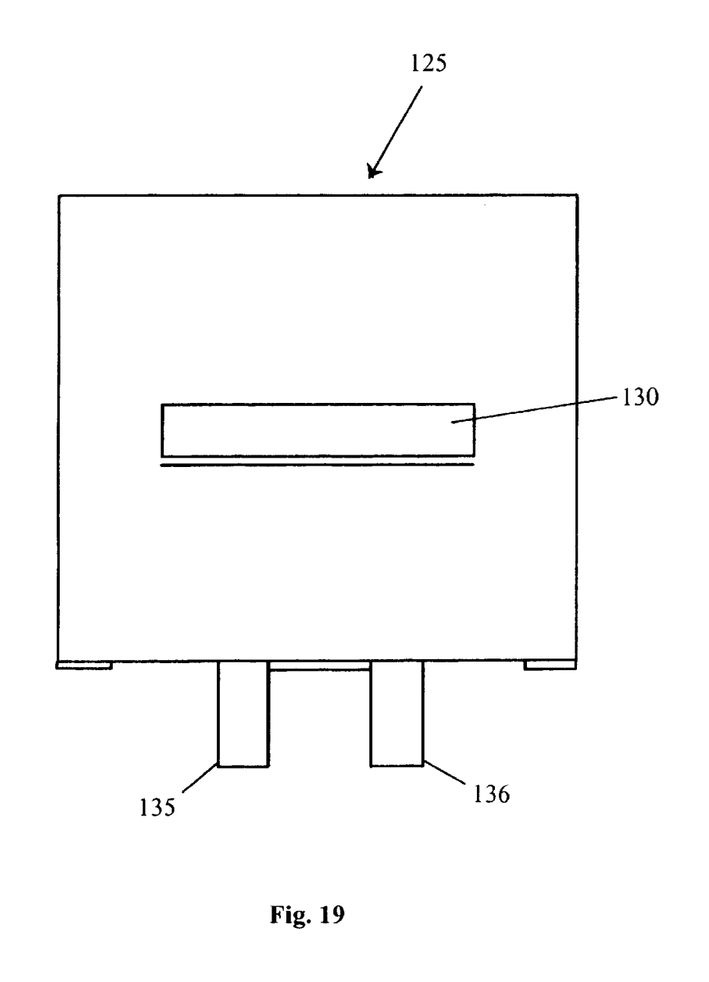
FIG. 19 is a front elevational view of a heat shield attachment for use with the coffee roaster.
Figure 20:
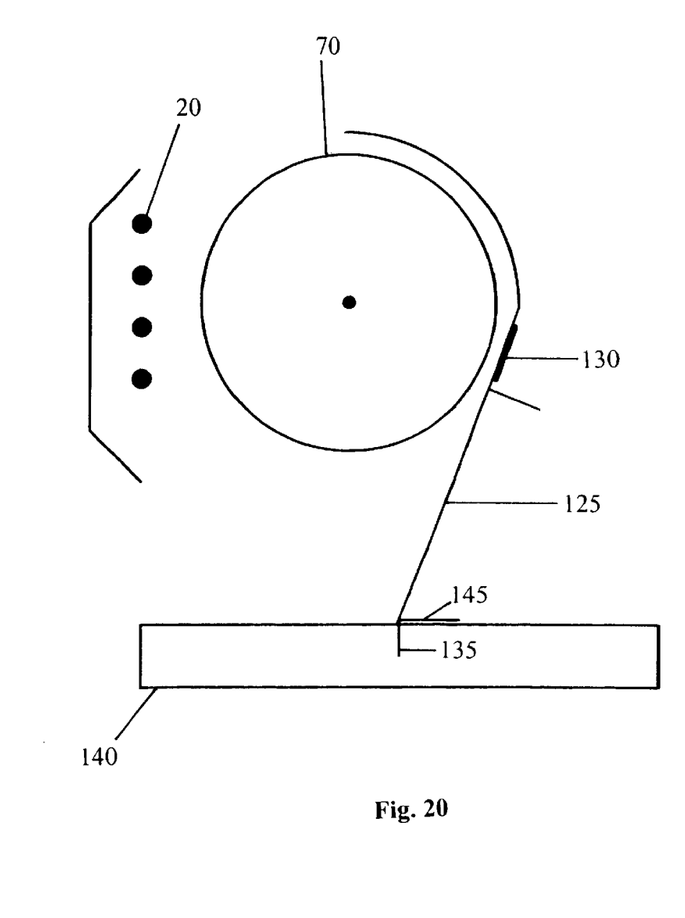
FIG. 20 is a side elevational schematic view of the heat shield attachment.

One additional item that can be used to facilitate a quicker roasting time is a heat shield that is specifically designed for use with the Ronco or similar home appliance rotisserie oven. The heat shield will capture and reflect the heat radiating from the electrical heating elements 20, creating a second enclosure within the enclosed oven unit. As shown in FIGS. 19 and 20, one preferred embodiment of the shield 125 is made of a heat-resistant material, such as stainless steel that has a glass window 130 for viewing the coffee beans during the roasting process. Heat shield 125 is advantageously simple to install. After the assembled roaster has been placed in the Ronco unit (see FIG. 20), one places the legs 135 and 136 of the heat shield through the slots in the greasepan 140 provided by Ronco with another leg 145 bent at a 90° angle, providing stability. The specially designed heat shield can reduce the roasting time by as much as 45–50%.

After extensive testing of the coffee roaster appliance constructed in accordance with this invention, it has been determined that up to two pounds of green coffee beans can be roasted at any one time, with exceptional results. Depending upon roast time, quantity, etc., the beans can be roasted from a light to very dark roast, in a consistent fashion. It is further worth noting that the coffee roaster of this invention is the first economical means for the home roaster to be able to roast a quantity of green coffee beans as large as two pounds.

A particular feature of the preferred embodiments of the invention is that it has no screws, nuts or bolts. As a result, there is no need for any tools such as wrenches, screwdrivers, etc., to install or remove the adapter from the oven, which makes installation, as well as removal, a snap.

Although the present invention has been described in terms of certain preferred embodiments and exemplified with respect thereto, one skilled in the art will readily appreciate that various modifications, changes, omissions and substitutions may be made without departing from the spirit and scope of the present invention. It is intended that the present invention be limited solely by the scope of the following claims:

What is claimed is:

1. A coffee roaster attachment for a conventional home appliance rotisserie oven having a gear-driven rotisserie assembly comprising at least two planar elements at least one of which is a gear wheel, and at least one rod connecting said gear wheel to said other planar element, and a rotisserie driving mechanism comprising:

a cylindrical shell;

at least one support connected to said shell and adapted to receive said at least one rod whereby rotation of said gear-driven rotisserie assembly causes rotation of said shell;

means for securing said at least one support to said at least one rod to hold one end of said shell against one of said planar elements when the other planar element is not present; and said other planar element covering the opposite end of said cylindrical shell.

2. The coffee roaster attachment of claim 1 further comprising a heat reflector adapted to be positioned to reflect heat towards said shell.

3. The coffee roaster attachment of claim 1 wherein said gear-driven rotisserie assembly comprises at least two rods connecting said gear wheel to said other planar element and wherein said at least one support is adapted to receive at least one of said at least two rods.

4. The coffee roaster attachment of claim 3 further comprising a heat reflector adapted to be positioned to reflect heat towards said shell.

5. A coffee roaster attachment for a conventional home appliance rotisserie oven having a gear-driven rotisserie assembly comprising at least two planar elements at least one of which is a gear wheel, and at least two rods connecting said gear wheel to said other planar element, and a rotisserie driving mechanism comprising:

a cylindrical shell;

at least one spring adapted to be stretched between said at least two rods and prevent movement of said support with respect to said at least two rods.

6. The coffee roaster attachment of claim 5 further comprising a heat reflector adapted to be positioned to reflect heat towards said shell.

7. A coffee roaster attachment for a conventional home appliance rotisserie oven having a gear-driven rotisserie assembly comprising at least two planar elements at least one of which is a gear wheel, and at least two rods connecting said gear wheel to said other planar element, and a rotisserie driving mechanism comprising:

a cylindrical shell for holding coffee beans; and at least one clip adapted to hold said shell against one of said planar elements; and said other planar element covering the opposite end of said cylindrical shell.

8. The coffee roaster attachment of claim 7 further comprising a heat reflector adapted to be positioned to reflect heat towards said shell.

9. The coffee roaster attachment of claim 7 wherein said at least one clip is adapted to receive both said shell and at least one of said at least two rods.

10. The coffee roaster attachment of claim 9 further comprising a heat reflector adapted to be positioned to reflect heat towards said shell.

11. The coffee roaster attachment of claim 9 wherein said at least one clip is further adapted to prevent movement of said clip with respect to said one of said at least two rods.

12. The coffee roaster attachment of claim 11 further comprising a heat reflector adapted to be positioned to reflect heat towards said shell.

13. A coffee roaster attachment for a conventional home appliance rotisserie oven having a gear-driven rotisserie assembly comprising at least two planar elements at least one of which is a gear wheel, and at least one rod connecting said gear wheel to said other planar element, and a rotisserie driving mechanism comprising:

a cylindrical shell;

at least one spring-loaded connector adapted to connect said shell to one of said at least two planar elements.

14. The coffee roaster attachment of claim 13 further comprising a heat reflector adapted to be positioned to reflect heat towards said shell.

15. The coffee roaster attachment of claim 13 wherein said gear-driven rotisserie assembly comprises at least two rods connecting said gear wheel to said other planar element.

16. The coffee roaster attachment of claim 15 further comprising a heat reflector adapted to be positioned to reflect heat towards said shell.

17. A coffee roaster attachment for a conventional home appliance rotisserie oven having a gear-driven rotisserie assembly comprising at least two planar elements at least one of which is a gear wheel, and at least one rod connecting said gear wheel to said other planar element, and a rotisserie driving mechanism comprising:

a cylindrical shell;

retainers, not including screws, nuts, or bolts, for holding one end of said shell against one of said planar elements;

said other planar element covering the opposite end of said cylindrical shell; and said shell adapted for rotation when said gear wheel is rotated by said rotisserie driving mechanism.

18. The coffee roaster attachment of claim 17 further comprising a heat reflector adapted to be positioned to reflect heat towards said shell.

19. The coffee roaster attachment of claim 17 wherein said gear-driven rotisserie assembly comprises at least two rods connecting said gear wheel to said other planar element.

* * * * *